(12) United States Patent
Nishimura

(10) Patent No.: US 10,253,141 B2
(45) Date of Patent: Apr. 9, 2019

(54) PROCESS FOR PRODUCING WET RUBBER MASTERBATCH, WET RUBBER MASTERBATCH, AND RUBBER COMPOSITION CONTAINING WET RUBBER MASTERBATCH

(71) Applicant: TOYO TIRE & RUBBER CO., LTD., Osaka-shi, Osaka (JP)

(72) Inventor: Chiya Nishimura, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 97 days.

(21) Appl. No.: 15/308,623

(22) PCT Filed: Jan. 9, 2015

(86) PCT No.: PCT/JP2015/050484
§ 371 (c)(1),
(2) Date: Nov. 3, 2016

(87) PCT Pub. No.: WO2015/194197
PCT Pub. Date: Dec. 23, 2015

(65) Prior Publication Data
US 2017/0152353 A1 Jun. 1, 2017

(30) Foreign Application Priority Data
Jun. 19, 2014 (JP) .................................. 2014-125923

(51) Int. Cl.
| | | |
|---|---|---|
| *C08K 3/04* | (2006.01) | |
| *C08J 3/22* | (2006.01) | |
| *B29B 13/06* | (2006.01) | |
| *C08C 1/14* | (2006.01) | |
| *B29B 7/42* | (2006.01) | |
| *B29B 7/74* | (2006.01) | |
| *B29B 7/82* | (2006.01) | |
| *B29B 7/84* | (2006.01) | |
| *B29B 7/90* | (2006.01) | |
| *B29B 15/02* | (2006.01) | |
| *B29B 13/02* | (2006.01) | |
| *B29C 47/00* | (2006.01) | |
| *B29K 21/00* | (2006.01) | |
| *B29C 47/38* | (2006.01) | |
| *B29C 47/60* | (2006.01) | |
| *B29K 105/00* | (2006.01) | |
| *B29K 105/16* | (2006.01) | |

(52) U.S. Cl.
CPC ............... *C08J 3/22* (2013.01); *B29B 7/428* (2013.01); *B29B 7/7495* (2013.01); *B29B 7/82* (2013.01); *B29B 7/842* (2013.01); *B29B 7/90* (2013.01); *B29B 13/02* (2013.01); *B29B 13/06* (2013.01); *B29B 15/02* (2013.01); *C08C 1/14* (2013.01); *C08J 3/226* (2013.01); *C08K 3/04* (2013.01); *B29C 47/0009* (2013.01); *B29C 47/385* (2013.01); *B29C 47/6012* (2013.01); *B29K 2021/00* (2013.01); *B29K 2105/0064* (2013.01); *B29K 2105/16* (2013.01); *C08J 2307/02* (2013.01); *C08J 2407/02* (2013.01)

(58) Field of Classification Search
CPC ................. C08J 3/22; C08C 1/14; C08K 3/04
See application file for complete search history.

(56) References Cited

U.S. PATENT DOCUMENTS

| | | | |
|---|---|---|---|
| 9,527,968 B2* | 12/2016 | Nomura | ................... B29B 13/06 |
| 10,106,674 B2* | 10/2018 | Nishimura | ................ C08L 9/00 |
| 2003/0128624 A1 | 7/2003 | Inoue et al. | |
| 2009/0018238 A1 | 1/2009 | Yanagisawa et al. | |
| 2015/0247011 A1 | 9/2015 | Nomura et al. | |
| 2017/0058110 A1* | 3/2017 | Nishimura | ................ C08L 9/00 |
| 2018/0179303 A1* | 6/2018 | Nishimura | ................ B60C 1/00 |
| 2018/0230276 A1* | 8/2018 | Nishimura | ................ B60C 1/00 |

FOREIGN PATENT DOCUMENTS

| | | | |
|---|---|---|---|
| JP | 2003-164746 A | | 6/2003 |
| JP | 2006-213815 A | | 8/2006 |
| JP | 2006-346958 A | | 12/2006 |

(Continued)

OTHER PUBLICATIONS

Office Action dated Nov. 14, 2017, issued in counterpart Japanese Application No. 2014-125923, with English translation. (7 pages).
International Search Report dated Mar. 31, 2015, issued in counterpart International Application No. PCT/JP2015/050484 (2 pages).
Notification of Transmittal of Translation of the International Preliminary Report on Patentability (Form PCT/IB/338) issued in counterpart International Application No. PCT/JP2015/050484 dated Dec. 29, 2016 with Forms PCT/IB/373 and PCT/ISA/237. (7 pages).

(Continued)

*Primary Examiner* — Hannah J Pak
(74) *Attorney, Agent, or Firm* — Westerman, Hattori, Daniels & Adrian, LLP

(57) ABSTRACT

A method for producing a wet rubber masterbatch uses a single-screw extruder. The single-screw extruder includes a screw, and an external cylinder in which a slit extended along the length direction of the external cylinder (the screw-shaft direction) is formed in an internal wall surface of the external cylinder, and when the width of the slit is represented by A and the clearance between a crest of the screw and the internal wall surface of the external cylinder is represented by B, the following expression (1) is satisfied:

$$0 < AB(Y)/AB(X) < 0.9 \qquad (1)$$

wherein AB (Y) is the product of A and B at a downstream side along the screw-shaft direction of the external cylinder, and AB (X) is the product of A and B at an upstream side along the screw-shaft direction of the external cylinder.

5 Claims, 2 Drawing Sheets

(56) References Cited

FOREIGN PATENT DOCUMENTS

| | | |
|---|---|---|
| JP | 4505038 B1 | 7/2010 |
| JP | 4527800 B1 | 8/2010 |
| JP | 2010-221093 A | 10/2010 |
| JP | 2012-131943 A | 7/2012 |
| WO | 2014/073234 A1 | 5/2014 |

OTHER PUBLICATIONS

Decision of Refusal dated May 15, 2018, issued in counterpart Japanese Application No. 2014-125923, with English translation. (9 pages).

Office Action dated Mar. 26, 2018, issued in counterpart Chinese Application No. 201580032974.0, with English translation. (14 pages).

Office Action dated Mar. 9, 2018, issued in counterpart Japanese Application No. 2014-125923, with English translation. (8 pages).

\* cited by examiner (a)

(b)

PROCESS FOR PRODUCING WET RUBBER MASTERBATCH, WET RUBBER MASTERBATCH, AND RUBBER COMPOSITION CONTAINING WET RUBBER MASTERBATCH

TECHNICAL FIELD

The present invention relates to a method for producing a wet rubber masterbatch obtained using at least a filler, a dispersing solvent and a rubber latex solution as raw materials; a wet rubber masterbatch; and a rubber composition containing the wet rubber masterbatch. The present invention relates particularly to a wet rubber masterbatch producing method giving a rubber which is restrained from being deteriorated and is excellent in rubber physical properties, in particular, rubber strength; a wet rubber masterbatch produced by this producing method; and a rubber composition containing the wet rubber masterbatch.

BACKGROUND ART

Hitherto, in the rubber industry, it has been known that when a rubber composition containing a filler such as carbon black is produced, a wet rubber masterbatch is used to improve the workability of the composition, and the dispersibility of the filler. This manner is a manner of: mixing a filler and a dispersing solvent beforehand with each other at a predetermined ratio, dispersing the filler into the dispersing solvent by a mechanical force, mixing the resultant filler-containing slurry solution with a rubber latex solution in a liquid phase and then adding a coagulant such as an acid thereto; and further collecting the resultant coagulate, and then drying the product. When the case of using the wet rubber masterbatch is compared with the case of using a dry rubber masterbatch obtained by mixing a filler with a rubber in a solid phase, the former case gives a rubber composition excellent in filler dispersibility and rubber physical properties such as workability and reinforceability. The use of such a rubber composition as a raw material makes it possible to produce a rubber product, for example, a pneumatic tire decreased in rolling resistance and excellent in fatigue resistant performance.

In the above-mentioned wet rubber masterbatch producing method, a method for removing water originating from the dispersing solvent and the rubber latex solution from the filler-containing rubber coagulate obtained through/after the coagulation step is, for example, a method of subjecting the filler-containing rubber coagulate to solid-liquid separation by, e.g., a filtrating method or centrifugal method, and then using an arbitrarily-selected mixing machine to knead this filler-containing rubber coagulate while the product is heated, thereby dehydrating the product. According to this dehydrating method, as the number of dehydrating, drying and plasticizing steps or such steps is increased or the heating temperature at the time of the kneading is heightened, the wet rubber masterbatch obtained through/after the dehydration can be decreased in water content by percentage. However, when the number of the dehydrating, drying and plasticizing steps or such steps, and calorie and/or mechanical energy applied at the dehydration become large, the resultant wet rubber masterbatch undergoes a cleavage of polymer molecular chains thereof, and other inconveniences, so that the finally obtained rubber composition may be deteriorated in vulcanized rubber properties. Accordingly, in the actual situation, there is a room for making many contrivances in the dehydrating, drying and plasticizing steps or such steps in the wet rubber masterbatch producing method.

Patent Documents 1 and 2 listed below each describe a method of using a twin-screw extruder when a filler-containing rubber coagulate is dehydrated and dried.

Moreover, Patent Document 3 listed below describes a technique of using a screw type dehydrator in which its shaft is not limited in number to dehydrate a mixture of a rubber material and a slurry of an inorganic filler. This screw type dehydrator is a screw type dehydrator including the following: a cylinder having, at an upstream side thereof, a hopper opening through which a matter to be treated is supplied and having, at a downstream side thereof, a discharging opening through which the matter to be treated is discharged; at least one screw shaft rotatably supported by the cylinder; and at least one screw having a crest formed spirally in the external circumferential surface of the screw shaft. This dehydrator is characterized in that: the dehydrator includes a first dehydrating section positioned at the hopper opening side of the cylinder, and a second dehydrating section positioned at the discharging-opening side thereof; the diameter of the screw shaft is made gradually large into the advancing direction of the screw in the first dehydrating section; and pin members are fitted to the second dehydrating section, one of the two ends of each of the pin members being fixed to an inner wall of the cylinder, and the other end being projected in a space between adjacent portions of the crest.

PRIOR ART DOCUMENTS

Patent Documents

Patent Document 1: JP-A-2006-213815
Patent Document 2: JP-A-2006-346958
Patent Document 3: JP-A-2010-221093

DISCLOSURE OF THE INVENTION

Problems to be Solved by the Invention

However, the present inventors have made eager investigations to find out the following: according to the techniques described in Patent Documents 1 and 2, the twin-screw extruder is used to dehydrate and dry a filler-containing rubber coagulate to produce a wet rubber masterbatch; thus, mechanical energy given to the wet rubber masterbatch tends to become large to deteriorate its rubber component; and the finally obtained vulcanized rubber tends to be deteriorated in tearing resistant performance, and stress property in the high-strain region.

According to the technique described in Patent Document 3, the screw type dehydrator, which has pin moieties fixed to an inner wall of a cylinder, is used to cause a high shearing force to act onto the rubber component passing between the pin moieties to cleave polymer chains in the rubber component, so that a deterioration of the rubber component advances easily. As a result, it has been found out that the finally obtained vulcanized rubber may be deteriorated in tearing resistant performance, and stress property in the high-strain region.

In light of the foregoing, the present invention has been made. An object thereof is to provide a wet rubber masterbatch producing method giving a rubber which is restrained from being deteriorated and is excellent in rubber physical properties, in particular, rubber strength; a wet rubber masterbatch produced by this producing method; and a rubber composition containing the wet rubber masterbatch.

Means for Solving the Problems

The object can be attained by the present invention as described below. Thus, the present invention relates to a method for producing a wet rubber masterbatch obtained using at least a filler, a dispersing solvent and a rubber latex solution as raw materials, including a coagulation step of mixing a slurry solution containing the filler and the dispersing solvent, and the rubber latex solution with each other to be coagulated, thereby producing a filler-containing rubber coagulate, and a heating step of using a single-screw extruder to heat the filler-containing rubber coagulate to 160° C. to 200° C., thereby dehydrating, drying and plasticizing this coagulate in a single step, wherein the single-screw extruder is an extruder including a screw, and an external cylinder in which a slit extended along the length direction of the external cylinder (the screw-shaft direction) is made in an internal wall surface of the external cylinder, and when the width of the slit is represented by A and the clearance between a crest of the screw and the internal wall surface of the external cylinder is represented by B, the following expression (1) is satisfied:

$$0 < AB(Y)/AB(X) < 0.9 \quad (1)$$

wherein AB (Y) is the product of A and B at a downstream side along the screw-shaft direction of the external cylinder, and AB (X) is the product of A and B at an upstream side along the screw-shaft direction of the external cylinder.

According to this producing method, a slurry solution containing a filler and a dispersing solvent and a rubber latex solution are mixed with each other to be coagulated, thereby producing a filler-containing rubber coagulate (coagulation step), and this coagulate is dehydrated, dried and plasticized in a single step (heating step). Accordingly, the number of heating steps is decreased from that in any conventional technique of performing dehydration, drying and plasticization separately from each other to make it possible to produce a wet rubber masterbatch giving a rubber which is restrained from being deteriorated and is excellent in rubber physical properties, in particular, rubber strength. In this heating step, a single-screw extruder is used to heat the filler-containing rubber coagulate to 160° C. to 200° C. If the heating temperature is lower than 160° C., the water content by percentage in the filler-containing rubber coagulate is not sufficiently lowered, so that this coagulate is heightened in viscosity when extruded. Thus, the product may not be sufficiently plasticized. In the meantime, if the heating is higher than 200° C., the resultant rubber may be deteriorated by an excessive thermal history. The heating temperature in the heating step is set into a range preferably from 180° C. to 200° C. to attain consistency between a reduction in the water content by percentage in the rubber coagulate and a restraint of a deterioration of the rubber component.

In this producing method, as the single-screw extruder, an extruder is used which includes a screw, and an external cylinder in which a slit extended along the length direction of the external cylinder (the screw-shaft direction) is made in an internal wall surface of the external cylinder. Additionally, in the present invention, at the time of representing the width of the slit by A and representing the clearance between a crest of the screw and the internal wall surface of the external cylinder by B, the following expression (1) is satisfied:

$$0 < AB(Y)/AB(X) < 0.9 \quad (1)$$

wherein AB (Y) is the product of A and B at a downstream side along the screw-shaft direction of the external cylinder, and AB (X) is the product of A and B at an upstream side along the screw-shaft direction of the external cylinder. In the present invention, when the ratio of AB (Y)/AB (X) is set to less than 0.9, the wet rubber masterbatch is more strongly compressed as the wet rubber masterbatch advances, inside the single-screw extruder, further to the downstream side along the screw-shaft direction. As a result, the water content by percentage in the wet rubber masterbatch can be decreased while the rubber component in the wet rubber masterbatch is restrained from being deteriorated.

In the present invention, the "downstream side along the screw-shaft direction" means the discharge opening side of the single-screw extruder, and the "upstream side along the screw-shaft direction" means the supplying-opening side thereof, this supplying opening being a supplying opening through which any rubber material and others are charged into the single-screw extruder. A and B "at the downstream side along the screw-shaft direction of the external cylinder" are preferably the following, respectively: the slit width of the slit positioned at the downmost stream side; and the clearance between the crest of the screw that is positioned at the downmost stream side and the internal wall surface of the external cylinder that is positioned at the same side. A and B "at the upstream side along the screw-shaft direction of the external cylinder" are preferably the following, respectively: the slit width of the slit positioned at the upmost stream side; and the clearance between the crest of the screw that is positioned at the upmost stream side and the internal wall surface of the external cylinder that is positioned at the same side.

In the wet rubber masterbatch producing method, the screw is preferably a screw in which the height of the crest of the screw is made gradually small from the upstream side toward the downstream side along the screw-shaft direction. Generally, inside a single-screw extruder, at the time when a rubber component surmounts a crest of its screw to advance toward the downstream side of the single-screw extruder along the screw-shaft direction, a maximum shearing force acts onto the rubber component. Consequently, as the height of the crest of the screw is larger, the efficiency of dehydrating the rubber component becomes better. However, a deterioration of the rubber component is more easily advanced. In the present invention, however, in the case of using the above-mentioned screw, in which the height of the screw crest is made gradually small from the upstream side toward the downstream side along the screw-shaft direction, shearing force given to the rubber component can be moderated into an appropriate degree. Thus, the water content by percentage in the wet rubber masterbatch can be further decreased while the deterioration of the rubber component in the wet rubber masterbatch is restrained.

In the wet rubber masterbatch producing method, it is preferred that the screw is a screw having a shaft diameter made larger from the upstream side toward the downstream side along the screw-shaft direction. This embodiment makes it possible to gradually heighten shearing force given to the rubber component to restrain an excessive shearing force from being given to the rubber component. Thus, the water content by percentage in the wet rubber masterbatch can be further decreased while the deterioration of the rubber component in the wet rubber masterbatch is restrained.

In the wet rubber masterbatch producing method, it is preferred that the screw is a screw having at least one step permitting the shaft diameter of the screw to become larger toward a downstream side of the screw. According to this embodiment, in the heating step, the rubber component is blocked by the step to receive shearing force while the component remains and stays, to an appropriate extent, inside the single-screw extruder. Thus, the water content by percentage in the wet rubber masterbatch can be further decreased while the deterioration of the rubber component in the wet rubber masterbatch is restrained.

The present invention relates to a wet rubber masterbatch produced by the producing method according to any one of the paragraphs concerned, and relates particularly to a rubber composition containing the wet rubber masterbatch. Vulcanized rubbers obtained by vulcanizing this wet rubber masterbatch and this rubber composition, respectively, are restrained from being rubber-deteriorated and are excellent in rubber physical properties, particularly, rubber strength.

MODE FOR CARRYING OUT THE INVENTION

Figure 1:
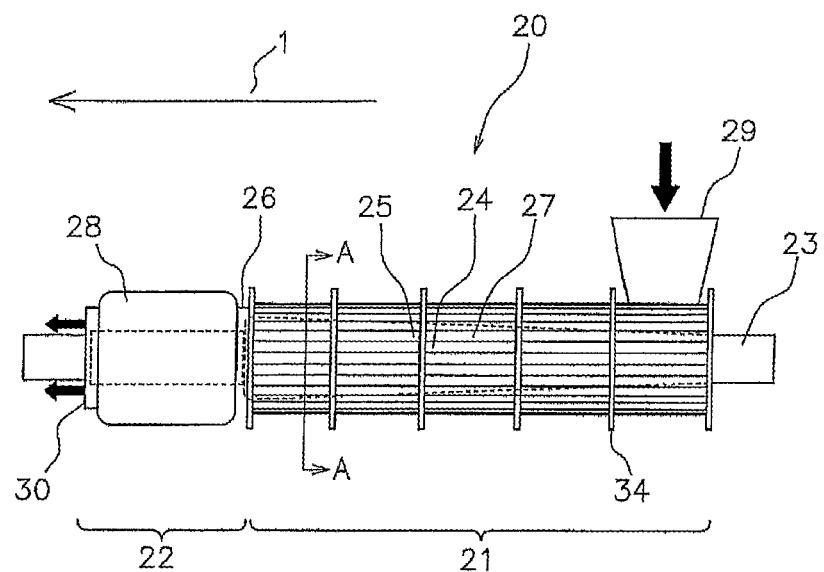
FIG. 1 illustrates an example of an external appearance of a single-screw extruder usable in the present invention.

The wet rubber masterbatch producing method according to the present invention has at least a coagulation step and a heating step. Hereinafter, each of the steps will be described.

Coagulation Step

In the coagulation step, a slurry solution containing a filler and a dispersing solvent, and a rubber latex solution are mixed with each other to be coagulated, thereby producing a filler-containing rubber coagulate. It is preferred that the coagulation step has, particularly, the following steps: a step (I) in which when the filler is dispersed into the dispersing solvent, at least one portion of the rubber latex solution is added thereto to produce a slurry solution containing the filler to which rubber latex particles adhere; a step (II) of mixing the slurry solution with the rest of the rubber latex solution to produce a rubber latex solution containing the filler, to which the rubber latex particles adhere; and a step (III) of coagulating the rubber latex solution containing the filler, to which the rubber latex particles adhere, to produce a filler-containing rubber coagulate.

In the present invention, the filler denotes an inorganic filler used usually in the rubber industry, such as carbon black, silica, clay, talc, calcium carbonate, magnesium carbonate, or aluminum hydroxide. Among these inorganic fillers, carbon black is in particular preferably usable in the present invention.

As the carbon black, an electroconductive carbon black, such as acetylene black or Ketchen black may be used, in addition to a carbon black used in an ordinary rubber industry, such as SAF, ISAF, HAF, FEF, or GPF. The carbon black may be granulated carbon black, which is granulated in an ordinary rubber industry, considering the handleability thereof, or may be non-granulated carbon black.

The dispersing solvent is in particular preferably water. The solvent may be, for example, water containing an organic solvent.

As the rubber latex solution, a natural rubber latex solution and a synthetic rubber latex solution are usable.

The natural rubber latex solution is a natural product obtained by metabolic effect of a plant. Particularly preferred is a natural-rubber/water system latex solution in which a dispersing solvent is water. The number-average molecular weight of the natural rubber in the natural rubber latex used in the present invention is preferably 2000000 or more, preferably 2500000 or more. The synthetic rubber latex solution is, for example, a latex solution of styrene-butadiene rubber, butadiene rubber, nitrile rubber or chloroprene rubber produced by emulsion polymerization.

Hereinafter, a description will be made about a preferred example of the coagulation step on the basis of an example in which carbon black is used as the filler, and a natural rubber latex solution is used as the rubber latex solution. This case makes it possible to produce a wet rubber masterbatch which is very high in carbon black dispersion degree and is further improved in low exothermic performance, durability performance and rubber strength when the masterbatch is made into vulcanized rubber. About the natural rubber latex, concentrated latex, fresh latex named field latex, and other latexes are usable without being distinguished from each other.

In the wet rubber masterbatch producing method according to the present invention, it is unnecessary to use an additive called a viscosity stabilizer, which has a purpose for restraining a rise in the viscosity of any wet rubber masterbatch at an initial time of the storage thereof. Examples of the viscosity stabilizer include hydrazide compounds such as acetic acid hydrazide, propionic acid hydrazide, butyric acid hydrazide, caproic acid hydrazide, and cyclopropylhydrazide; hydroxyamine sulfate; semicarbazide; and dimedone (1,1-dimethylcyclohexane-3,5-dione).

(1) Step (I)

In the step (I), at the time of dispersing the carbon black into the dispersing solvent, at least one portion of a natural rubber latex solution is added thereto to produce a slurry solution containing the carbon black to which natural rubber latex particles adhere. It is allowable to mix the natural rubber latex solution beforehand with the dispersing solvent, and then add the carbon black to the mixture to disperse the carbon black in the mixture. It is also allowable to add the carbon black to the dispersing solvent; and next add the natural rubber latex solution thereto at a predetermined adding-speed and simultaneously disperse the carbon black in the dispersing solvent. Alternatively, it is allowable to add the carbon black to the dispersing solvent; and next add thereto a predetermined volume of the natural rubber latex solution several times through operations separated from each other and simultaneously disperse the carbon black in the dispersing solvent. By dispersing the carbon black into the dispersing solvent in the presence of the natural rubber latex solution, a slurry solution can be produced which contains the carbon black to which natural rubber latex particles adhere. The addition amount of the natural rubber latex solution in the step (I) is, for example, from 0.075% to 12% by mass of the total amount of the natural rubber latex solution to be used (the amount of the whole of the solutions to be added in the step (I) and in the step (II).

In the step (I), the solid (rubber) content in the natural rubber latex solution to be added is preferably from 0.25% to 15%, more preferably from 0.5% to 6% by mass of the carbon black. The concentration of the solid (rubber) in the natural rubber latex solution to be added is preferably from 0.2% to 5% by mass, more preferably from 0.25% to 1.5% by mass. In these cases, a wet rubber masterbatch can be produced in which the dispersion degree of the carbon black is heightened while the carbon black is surely caused to adhere to the natural rubber latex particles.

In the step (I), the method for mixing the carbon black and the dispersing solvent with each other in the presence of the natural rubber latex solution is, for example, a method of dispersing the carbon black, using an ordinary dispersing machine such as a highly shearing mixer, a high shear mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of making a precise clearance between the rotor and the stator, the rotor is rotated to act a highly shearing effect. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by Silverson.

In the present invention, at the time of mixing the carbon black with the dispersing solvent in the presence of the natural rubber latex solution, thereby producing the slurry solution containing the carbon black, to which the rubber latex particles adhere, a surfactant may be added thereto in order to improve the carbon black in dispersibility. The surfactant may be a surfactant known in the rubber industry. Examples thereof include nonionic surfactants, anionic surfactants, cationic surfactants, and amphoteric ionic surfactants. Instead of the surfactant or in addition to the surfactant, an alcohol such as ethanol may be used. However, when the surfactant is used, it is feared that the finally obtained vulcanized rubber is lowered in rubber physical properties. Thus, the blend amount of the surfactant is preferably 2 parts or less by mass, more preferably 1 part or less by mass for 100 parts by mass of the solid (rubber) content in the natural rubber latex solution. It is preferred not to use any surfactant substantially. In order to restrain a deterioration of the solid (rubber) in the natural rubber latex solution in the steps (I) and (II), an anti-aging agent may be added to the latex solution. As the anti-aging agent, known anti-aging agent in the rubber industry may be used. Examples thereof include amine-based anti-aging agent, phenolic-based anti-aging agent, organic phosphite-based anti-aging agent and thioether-based anti-aging agent.

In the slurry solution produced in the step (I), the 90% volume particle diameter (μm) ("D90") of the carbon black, to which the natural rubber latex particles adhere, is preferably 31 μm or more, more preferably 35 μm or more. This case makes the carbon black excellent in dispersibility in the slurry solution and makes it possible to prevent the carbon black from re-aggregating, so that the slurry solution is excellent in storage stability and further the finally obtained vulcanized rubber is also excellent in low exothermic property, durability performance and rubber strength. In the present invention, the D90 of the carbon black, to which the natural rubber latex particles adhere, denotes a value obtained by measuring the whole including not only the carbon black but also the adhering natural rubber latex particles.

(2) Step (II)

In the step (II), the slurry solution is mixed with the rest of the natural rubber latex solution to produce a rubber latex solution containing the carbon black, to which the natural rubber latex particles adhere. The method for mixing the slurry solution with the rest of the natural rubber latex solution in a liquid phase is not particularly limited, and may be a method of mixing the slurry solution with the rest of the natural rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. As required, the whole of the dispersing machine or some other mixing system may be heated at the time of the mixing.

When the drying period and labor are considered in the next step (III), it is preferred that the rest of the natural rubber latex solution is higher in solid (rubber) concentration than the natural rubber latex solution added in the step (I). Specifically, the solid (rubber) concentration is preferably from 10 to 60% by weight, more preferably from 20 to 30% by weight.

(3) Step (III)

In the step (III), the rubber latex solution containing the carbon black, to which the natural rubber latex particles adhere, is coagulated to produce a filler-containing rubber coagulate. The method for the coagulation may be, for example, a method of adding a coagulant to the rubber latex solution containing the carbon black, to which the natural rubber latex particles adhere, to coagulate the rubber latex solution.

The coagulant used in the coagulation step may be a substance used ordinarily to coagulate a rubber latex solution, for example, an acid such as formic acid or sulfuric acid, or a salt such as sodium chloride.

About the ratio between the rubber component and the filler in the filler-containing rubber coagulate obtained through/after the step (III), it is preferred that the filler-containing rubber coagulate contains 30 to 80 parts by mass of the filler for 100 parts by mass (solid content) of the rubber. This case makes it possible to finally produce a wet rubber masterbatch in which improvements good in balance are made in the dispersion degree of the filler and in the low exothermic performance and durability performance of a vulcanized rubber produced from this masterbatch.

Heating Step

In the heating step, a single-screw extruder is used to heat the filler-containing rubber coagulate to 160° C. to 200° C., thereby dehydrating, drying and plasticizing this coagulate in a single step. FIG. 1 illustrates an example of a single-screw extruder usable in the present invention.

A single-screw extruder 20 has a screw 23, and an external cylinder 27 composed of a first external cylinder 25 positioned at a supplying-opening-29 side (upstream side) of the extruder 20 and a second external cylinder 26 positioned at a discharging-opening-30 side (downstream side) thereof. The filler-containing rubber coagulate obtained through/after the coagulation step is charged through the supplying opening 29 into the extruder, and is advanced along a length direction 1 of the external cylinder (screw-shaft direction) while kneaded. Finally, the filler-containing rubber coagulate is discharged through the discharging opening 30. The upstream side part of the extruder 20 is also called a dehydrating section 21, and the downstream side part thereof is also called a drying section (expander section) 22. As required, a jacket 28 may be fitted to the drying section 22 to adjust the temperature of this section. In the present invention, however, it is preferred that the extruder 20 has no pin moieties projected from an internal wall surface of the external cylinder in the drying section 22 toward the inside thereof. If the extruder 20 has, in the drying section 22, such pin moieties, a high shearing force acts onto the rubber component passing between the pin moieties to cleave chains of the polymer in the rubber component so that a deterioration of the rubber component advances easily. As a result, the finally obtained vulcanized rubber may be deteriorated in tearing resistant performance and stress property at the high-strain region. The length (L) of the external cylinder (barrel) of this single-screw extruder and the diameter (D) of the external cylinder may be equivalent to those of any single-screw extruder used in an ordinary rubber industry. Furthermore, the ratio (L/D) of the external cylinder length to the external cylinder diameter may be set at will.

Figure 2:
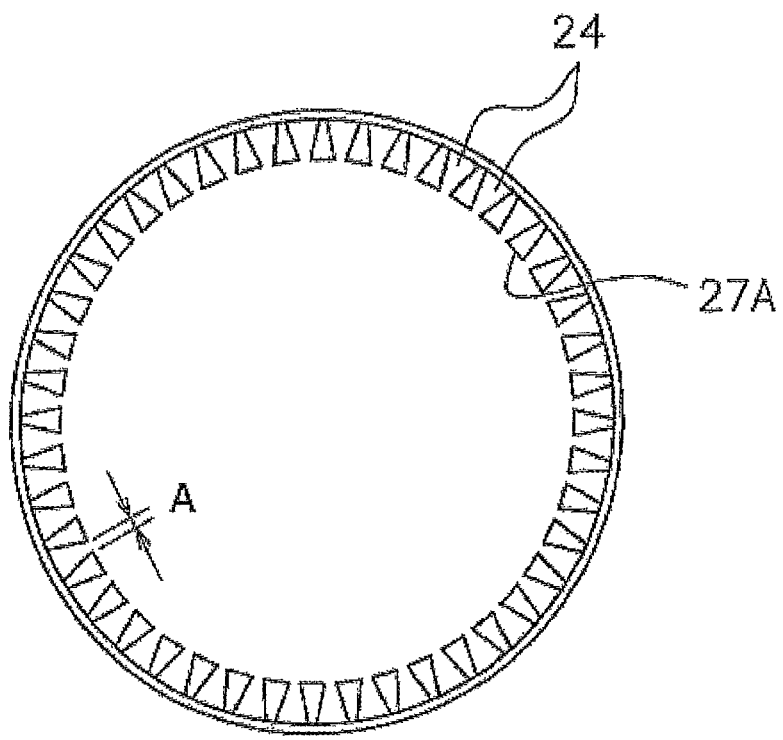
FIG. 2 is a sectional view of the extruder in FIG. 1 taken along line A-A when viewed in an arrow direction.
Figure 3:
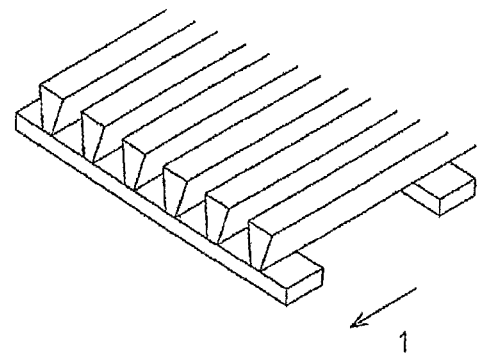
FIG. 3 illustrates an example of a development diagram of an internal wall surface of an external cylinder.

The internal wall surface of the external cylinder 27 has at least one slit 24 extended along a length direction 1 of the external cylinder (as illustrated in FIGS. 2 and 3, in the present embodiment, plural slits 24 are formed at regular intervals in the internal wall surface of the external cylinder). In the single-screw extruder 20 described in the embodiment, the slits 24 are formed in the internal wall surface of the dehydrating section 21 while the slits 24 are not formed in the drying section (expander section) 22. It is therefore preferred in the embodiment that A and B "at the downstream side along the screw-shaft direction of the external cylinder" are preferably the following, respectively: the slit width of each of the slits 24 positioned at the downmost stream side of the dehydrating section 21; and the clearance between the crest of the screw 23 that is positioned at the downmost stream side of the dehydrating section 21 and the internal wall surface of the external cylinder 27 that is positioned at the same side. As illustrated in FIG. 3, in the embodiment, an example is illustrated in which the slits 24 are continuously extended along the external cylinder length direction 1. However, slits may be extended while inclined to the external cylinder length direction 1. Furthermore, the slits 24 may be extended from a supplying-opening-29 side end of the external cylinder 27 to a discharging-opening-30 side end thereof. The slits 24 may be formed only in the dehydrating section 21, or may be intermittently extended along the external cylinder length direction 1. It is preferred to set the slit width A in the internal wall surface of the external cylinder into the range of 0.1 mm to 0.9 mm. If the width A is less than 0.1 mm, flow channels for water that are generated by dehydrating the wet rubber masterbatch become narrow so that the water content by percentage in the wet rubber masterbatch may be insufficiently lowered. If the width A is more than 0.9 mm, the contact area between the wet rubber masterbatch and the internal wall surface of the external cylinder becomes small so that the water content by percentage in the wet rubber masterbatch may be insufficiently lowered.

FIG. 2 has illustrated an example of the slits formed to widen the slit width from the internal wall surface of the external cylinder toward the depth direction of the slits. In the present invention, however, the slits formed in the internal wall surface of the external cylinder may be slits formed to make the slit width constant or narrow from the internal wall surface of the external cylinder toward the depth direction of the slits.

Figure 4:
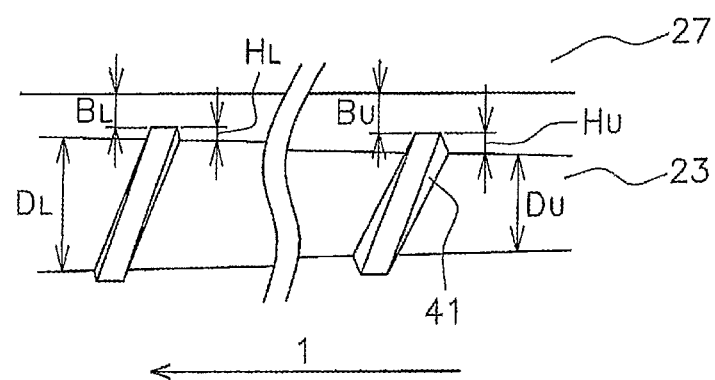
FIG. 4 is an explanatory view of the clearance B between a crest of a screw and an internal wall surface of an external cylinder.
Figure 4:
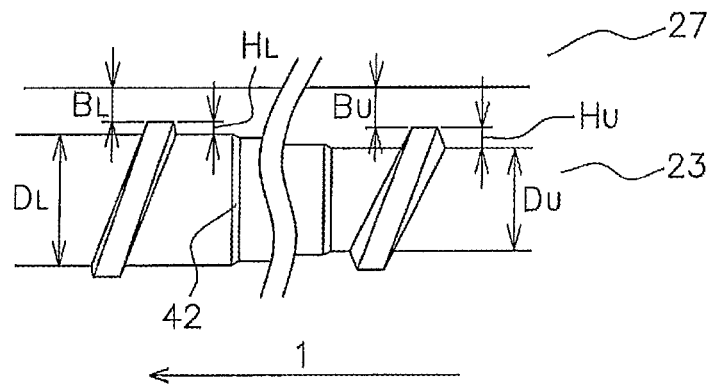

The shape of the screw 23 included in the single-screw extruder 20 may be any shape. In the present invention, however, at the time of representing the clearance between the crest of the screw 23 and the internal wall surface of the external cylinder 27 by B, the screw 23 is designed to satisfy the following expression (1) about a relationship between the clearance B and the slit width A of each of the slits 24 formed in the internal wall surface of the external cylinder:

$$0 < AB(Y)/AB(X) < 0.9 \tag{1}$$

wherein AB (Y) is the product of A and B at the downstream side along the screw-shaft direction of the external cylinder 27, and AB (X) is the product of A and B at the upstream side along the screw-shaft direction of the external cylinder 27. The clearance B is preferably from 1 mm to 10 mm both inclusive. If the clearance B is less than 1 mm, the flow channels for the rubber component become narrow so that an excessive shearing force acts onto the rubber component. Thus, the finally obtained vulcanized rubber may be deteriorated in rubber physical properties. If the clearance B is more than 10 mm, the flow channels for the rubber component become wide so that the shearing force given to the rubber component becomes short. Thus, the water content by percentage in the wet rubber masterbatch may be insufficiently lowered. The screw may be a heating mode screw. FIG. 4 each illustrate an example of a screw shape adoptable in the present invention.

FIG. 4(*a*) illustrates an example of the screw 23 in which the shaft diameter is made large from an upstream side along the screw-shaft direction toward a downstream side along the screw-shaft direction (the screw shaft diameter $D_L$ at the downstream side along the screw-shaft direction is larger than the screw shaft diameter $D_U$ at the upstream side along the screw-shaft direction). This structure makes it possible to gradually heighten shearing force given to the rubber component toward the downstream side to restrain the shearing force from being given excessively to the rubber component. Thus, the water content by percentage in the wet rubber masterbatch can be further decreased while the rubber component in the wet rubber masterbatch is restrained from being deteriorated. The screw 23 illustrated in FIG. 4(*a*) is formed to make the height of a crest 41 of the screw gradually small from the upstream side toward the downstream side along the screw-shaft direction (the height $H_L$ of the screw crest 41 at the downstream side along the screw-shaft direction is smaller than the height $H_U$ of the screw crest 41 at the upstream side along the screw-shaft direction). This structure makes it possible to moderate, to an appropriate extent, shearing force given to the rubber component at the downstream side along the screw-shaft direction, this side being a side where the shearing force acts strongly to the rubber component. Thus, the water content by percentage in the wet rubber masterbatch can be further decreased while the rubber component in the wet rubber masterbatch is restrained from being deteriorated. Moreover, the screw illustrated in FIG. 4(*a*) is formed to make the clearance $B_L$ between the crest 41 of the screw 23 at the downstream side along the screw-shaft direction and an internal wall surface of the external cylinder 27 smaller than the clearance B, between the crest 41 of the screw 23 at the upstream side along the screw-shaft direction and the internal wall surface of the external cylinder 27. However, in the present invention, the screw may be formed to make the crest height of the screw constant from the upstream side toward the downstream side along the screw-shaft direction as far as the expression (1) is satisfied.

FIG. 4(*b*) illustrates an example of the screw having at least one step 42 (referred to also as "collar") permitting the shaft diameter of the screw to become larger toward a downstream side of the screw 23. When this screw is adopted, the rubber component is blocked by the step in the heating step so that the rubber component receives shearing force while the rubber component remains and stays in an appropriate extent inside the single-screw extruder. Thus, the water content by percentage in the wet rubber masterbatch can be further decreased while the rubber component in the wet rubber masterbatch is restrained from being deteriorated. Since the screw 23 illustrated in FIG. 4(b) has the step 42, the shaft diameter $D_L$ of the screw at the downstream side along the screw-shaft direction is larger than the shaft diameter $D_U$ of the screw at the upstream side along the screw-shaft direction. Moreover, the example illustrated in FIG. 4(b) is formed to make the height $H_L$ of a crest 41 of the screw at the downstream side along the screw-shaft direction smaller than the height $H_U$ of the crest 41 of the screw at the upstream side along the screw-shaft direction; and make the clearance $B_L$ between the crest 41 of the screw 23 at the downstream side along the screw-shaft direction and an internal wall surface of an external cylinder 27 smaller than the clearance $B_U$ between the crest 41 of the screw 23 at the upstream side along the screw-shaft direction and the internal wall surface of the external cylinder 27. However, in the present invention, the screw may be formed to make the crest height of the screw constant from the upstream side toward the downstream side along the screw-shaft direction as far as the expression (1) is satisfied.

In the wet rubber masterbatch producing method according to the present invention, after the heating step, a kneading step and a vulcanization compounding agent kneading step are performed to blend various blending agents into the wet rubber masterbatch. In this way, a rubber composition can be produced.

Kneading Step:

This is a step of: incorporating, into the wet rubber masterbatch obtained through/after the heating step, compounding agents other than any vulcanization compounding agent, examples of the agents including stearic acid, zinc white, an anti-aging agent, silica, a silane coupling agent, softeners such as wax and oil, and a processing aid; and then using a mixing and dispersing machine to knead the individual components. In the kneading step, these blending agents are mixed with the rubber component to produce, for example, the following advantageous effects: after the masterbatch is vulcanized, the resultant rubber product is heightened in strength; the rubber is made good in kneadability and workability; and the rubber is prevented from being deteriorated by radicals generated by the cleavage of molecular chains of the rubber. In the mixing and kneading step, for example, a mesh-type type Bunbury mixer, a tangential type Bunbury mixer, or a kneader is usable. The use of the mesh-type Bunbury mixer is particularly preferred.

As the anti-aging agent, usually used for rubbers, aromatic amine-based anti-aging agent, amine-ketone-based anti-aging agent, monophenolic-based anti-aging agent, bisphenolic-based anti-aging agent, polyphenolic-based anti-aging agent, dithiocarbamic acid salt-based anti-aging agent, and thiourea-based anti-aging agent may be used singly or used by appropriately mixing. The content of the anti-aging agent(s) is more preferably from 0.3 to 3 parts by mass, even more preferably from 0.5 to 1.5 parts by mass for 100 parts by mass of the rubber component (solid) in the wet rubber masterbatch.

Vulcanization Compounding Agent Kneading Step:

Vulcanization compounding agents, for example, a vulcanizing agent such as sulfur, and a vulcanization accelerator are incorporated into the rubber composition obtained through/after the kneading step, and then the whole is kneaded. When the rubber composition obtained through/after the vulcanization compounding agent kneading step is heated to a predetermined temperature or higher, the vulcanizing agent in the rubber composition reacts with molecules of the rubber to form a crosslinkage structure between the rubber molecules, so that the molecules are made into a three-dimensional network structure to give rubbery elasticity to the composition.

Sulfur may be any ordinary sulfur for rubbers. Examples thereof include powdered sulfur, precipitated sulfur, insoluble sulfur, and highly dispersible sulfur. The content of the sulfur in the rubber composition according to the present invention is preferably from 0.3 to 6 parts by mass for 100 parts by mass of the rubber component. If the content of the sulfur is less than 0.3 part by mass, the vulcanized rubber is short in crosslinkage density to be lowered in rubber strength and others. If the content is more than 6.5 parts by mass, the rubber is deteriorated, particularly, in both of heat resistant performance and durability performance. In order to keep the rubber strength of the vulcanized rubber good and further improve the heat resistant performance and the durability performance, the content of the sulfur is more preferably set into the range of 1.5 to 5.5 parts by mass for 100 parts by mass of the rubber component.

As the vulcanization accelerator, usually used for vulcanizing rubbers, sulfenamide-based vulcanization accelerator, thiuram-based vulcanization accelerator, thiazole-based vulcanization accelerator, thiourea-based vulcanization accelerator, guanidine-based vulcanization accelerator, and dithiocarbamate-based vulcanization accelerator may be used singly or used by appropriately mixing.

The content of the vulcanization accelerator(s) is more preferably from 1 to 5 parts by mass, even more preferably from 1.5 to 4 parts by mass for 100 parts by mass of the rubber component.

EXAMPLES

Hereinafter, the present invention will be more specifically described through a description of examples thereof. Raw materials and apparatuses used therein are as follows:
Raw Materials Used:
a) Carbon black:
  Carbon black "N330": "SEAST 3" (manufactured by Tokai Carbon Co., Ltd.)
  Carbon black "N110: "SEAST 9" (manufactured by Tokai Carbon Co., Ltd.)
  Carbon black "N774": "SEAST SO" (manufactured by Tokai Carbon Co., Ltd.)
b) Dispersing solvent: Water
c) Rubber latex solution:
  Natural rubber concentrated latex solution: latex solution obtained by adding water to a rubber manufactured by Regitex Co., Ltd (having a DRC (dry rubber content) of 60% and a mass-average molecular weight of 236000) at ambient temperature to give a rubber component concentration of 25% by mass; and
  Natural rubber fresh latex solution: latex solution obtained by adding water to a rubber manufactured by a company Golden Hope (having a DRC (dry rubber content) of 31.2% and a mass-average molecular weight of 232000) at ambient temperature to give a rubber component concentration of 25% by mass
d) Coagulant: Formic acid (solution obtained by diluting a first-class 85% solution thereof into a 10% solution to adjust the pH of the diluted solution to 1.2), manufactured by Nacalai Tesque, Inc.
e) Zinc white: Zinc white No. 1, manufactured by Mitsui Mining & Smelting Co., Ltd.
f) Stearic acid, manufactured by NOF Corp.

g) Anti-aging agent: Aromatic amine-based agent N-phenyl-N'-(1,3-dimethylbutyl)-p-phenylenediamine "6PPD", manufactured by Monsanto Company; melting point: 44° C.;
h) Sulfur, manufactured by Tsurumi Chemical Industry Co., Ltd.
i) Vulcanization accelerator: "CBS" manufactured by Sanshin Chemical Industry Co., Ltd.

Evaluations:

Evaluations were made about a rubber obtained by using a predetermined mold to heat and vulcanize each of rubber compositions at 150° C. for 30 minutes.

Water Content by Percentage in Each Filler-Containing Rubber Coagulate:

In accordance with JIS K6238-2, the water content by percentage in a filler-containing rubber coagulate of each of the compositions was measured, using a heat-drying type moisture meter MX-50 manufactured by A & D Co., Ltd.

Mooney Viscosity of Each Wet Rubber Masterbatch:

In accordance with JIS K6300, the viscosity of the wet rubber masterbatch of each of the compositions was measured at 100° C. In the evaluation, the value of Comparative Example 1 was regarded as 100, and Examples 1 to 10 and Comparative Examples 2 to 5 were each evaluated through an index relative thereto; the value of Comparative Example 6 was regarded as 100, and Example 11 was evaluated through an index relative thereto; and the value of Comparative Example 7 was regarded as 100, and Example 12 was evaluated through an index relative thereto. It is shown that as the numerical value of the compositions is lower, the compositions are further plasticized to be better.

300% Elongation Modulus (M300) of Each Vulcanized Rubber:

In accordance with JIS-K 6251, an evaluating sample was prepared from each of the vulcanized rubbers, and then the 300% elongation modulus (M300 (MPa)) thereof was measured, using a JIS—#3 dumbbell. In the evaluation, the value of Comparative Example 1 was regarded as 100, and Examples 1 to 10 and Comparative Examples 2 to 5 were each evaluated through an index relative thereto; the value of Comparative Example 6 was regarded as 100, and Example 11 was evaluated through an index relative thereto; and the value of Comparative Example 7 was regarded as 100, and Example 12 was evaluated through an index relative thereto. It is shown that as the numerical value of the vulcanized rubbers is higher, the vulcanized rubbers are higher in rubber strength to be better.

Example 1

To a diluted natural rubber latex solution, the concentration thereof being adjusted to 0.5% by mass, were added 50 parts by mass of one of the carbon blacks (about the solid amount (rubber amount) in the latex solution, the ratio by mass of the solid to the carbon black was 1 part by mass). A ROBOMIX manufactured by PRIMIX Corp. was then used to disperse the carbon black therein (conditions of the ROBOMIX: 9000 rpm for 30 minutes). In this way, produced was a slurry solution containing the carbon black to which natural rubber latex particles adhered (step (I)).

Next, the rest of the natural rubber concentrated latex solution (latex solution into which water was added to adjust the solid (rubber) concentration therein to 25% by mass) was added to the slurry solution produced in the step (I) and containing the carbon black, to which the natural rubber latex particles adhered, to set the solid (rubber) content to 100 parts by mass in the total of the rest and the natural rubber latex solution used in the step (I). Thereafter, a mixer for household use, SM-L56 model, manufactured by SANYO Electric Co., Ltd. was used to mix the individual components with each other (mixer condition: 11300 rpm for 30 minutes) to produce a natural rubber latex solution containing the carbon black, to which the natural rubber latex particles adhered (step (II)).

Coagulation Step:

A 10% by mass solution of formic acid in water was added as a coagulant to the natural rubber latex solution produced in the step (II) and containing the carbon black, to which the natural rubber latex particles adhered, until the pH of the latex solution was turned to 4. In this way, a natural rubber coagulate containing the carbon black was produced (step (III)).

Heating Step:

The single-screw extruder illustrated in FIGS. 1 to 4 was used, this extruder being a squeezer type extruder [product No.: V-02 (manufactured by Suehiro EPM Corp.); barrel diameter: 90 mm; the ratio of the "barrel length"/the "barrel diameter" (L/D)=8.6; the width A of slits in an internal wall surface of its external cylinder: the slit width A (X) at an upstream side along the screw-shaft direction=0.9 mm, and the slit width A (Y) at a downstream side along the screw-shaft direction=0.7 mm; screw shape (2): a shape designed as follows: from the upstream side toward the downstream side along the screw-shaft direction, the crest height of the screw was constant and further the shaft diameter of the screw was made gradually large; and the clearance B between the crest of the screw and the internal wall surface of the external cylinder: the clearance B (X) at the upstream side along the screw-shaft direction=8.0 mm, and the clearance B (Y) at the downstream side along the screw-shaft direction=7.0 mm. While the above-mentioned natural rubber coagulate was kneaded at a heating temperature of 200° C. (heating temperature of the heating type screw: 200° C.), the product was dehydrated, dried and plasticized through a single step.

Kneading Step and Vulcanization Compounding Agent Kneading Step:

A B-type Bunbury mixer (manufactured by Kobe Steel, Ltd.) was used to blend various additives shown in Table 1 into the resultant natural wet rubber masterbatch to prepare a rubber composition. Physical properties of a vulcanized rubber thereof were measured. The results are shown in Table 1.

Examples 2 to 4, and Comparative Example 5

In each of the examples, a natural wet rubber masterbatch, a rubber composition and a vulcanized rubber were produced in the same way as in Example 1 except that one or more of A(X), A(Y), B(X) and B(Y) were varied to change the ratio of AB(Y)/AB(X).

Example 5

A natural wet rubber masterbatch, a rubber composition and a vulcanized rubber were produced in the same way as in Example 1 except that the screw shape of the screw was changed to a screw shape (1) designed as follows: from the upstream side toward the downstream side along the screw-shaft direction, the crest height of the screw was made gradually small and further the shaft diameter of the screw was made gradually large.

Example 6 and Comparative Example 2

In each of the examples, a natural wet rubber masterbatch, a rubber composition and a vulcanized rubber were produced in the same way as in Example 1 except that the screw shape of the screw was changed to the screw shape (1) and further one or more of A(X), A(Y), B(X) and B(Y) were varied to change the ratio of AB(Y)/AB(X).

Example 7

A natural wet rubber masterbatch, a rubber composition and a vulcanized rubber were produced in the same way as in Example 1 except that the screw shape of the screw was changed to a screw shape (3) designed as follows: from the upstream side toward the downstream side along the screw-shaft direction, the crest height of the screw was constant and further at least one step was formed.

Example 8

A natural wet rubber masterbatch, a rubber composition and a vulcanized rubber were produced in the same way as in Example 1 except that the screw shape of the screw was changed to a screw shape (4) designed as follows: from the upstream side toward the downstream side along the screw-shaft direction, the crest height of the screw was made gradually small and further at least one step was formed.

Example 9

A natural wet rubber masterbatch, a rubber composition and a vulcanized rubber were produced in the same way as in Example 1 except that the screw shape of the screw was changed to the screw shape (4) and further one or more of A(X), A(Y), B(X) and B(Y) were varied to change the ratio of AB(Y)/AB(X). Masterbatch, a rubber composition and a vulcanized rubber were produced.

Example 10

A natural wet rubber masterbatch, a rubber composition and a vulcanized rubber were produced in the same way as in Example 1 except that the screw shape was changed to the screw shape (4) and further the heating temperature was changed into the range from 160° C. to 200° C.

Examples 11 and 12

In each of the examples, a natural wet rubber masterbatch, a rubber composition and a vulcanized rubber were produced in the same way as in Example 1 except that the screw shape was changed to the screw shape (1) and further the species and the blend amount of the carbon black were changed.

Comparative Example 1

A natural wet rubber masterbatch, a rubber composition and a vulcanized rubber were produced in the same way as in Example 1 except that: instead of the heating step, two steps were performed, the steps being a dehydrating step (dehydrating temperature (temperature of the heating type screw of the single-screw extruder used at the time of the dehydrating): 160° C.) and a drying and plasticizing step (drying and plasticizing temperature (temperature of the heating type screw of the single-screw extruder used at the time of the drying and plasticizing): 160° C.); and one or more of A(X), A(Y), B(X) and B(Y) were varied to change the ratio of AB(Y)/AB(X). Physical properties of the vulcanized rubber are shown in Table 1.

Comparative Example 3

A natural wet rubber masterbatch, a rubber composition and a vulcanized rubber were produced in the same way as in Example 1 except that: the screw shape of the screw was changed to the screw shape (1); one or more of A(X), A(Y), B(X) and B(Y) were varied to change the ratio of AB(Y)/AB(X); and further as the single-screw extruder, the following was used: an extruder having pin moieties extended from an internal wall surface of a downstream side of its external cylinder toward the inside thereof.

Comparative Example 4

A natural wet rubber masterbatch, a rubber composition and a vulcanized rubber were produced in the same way as in Example 1 except that: instead of the heating step, two steps were performed, the steps being a dehydrating step using a centrifugal separator, and a drying and plasticizing step (drying and plasticizing temperature (temperature of the heating type screw of the single-screw extruder used at the time of the drying and plasticizing): 200° C.); and one or more of A(X), A(Y), B(X) and B(Y) were varied to change the ratio of AB(Y)/AB(X). Physical properties of the vulcanized rubber are shown in Table 1.

Comparative Examples 6 and 7

In each of the examples, a natural wet rubber masterbatch, a rubber composition and a vulcanized rubber were produced in the same way as in Example 1 except that: instead of the heating step, two steps were performed, the steps being a dehydrating step (dehydrating temperature (temperature of the heating type screw of the single-screw extruder used at the time of the dehydrating): 160° C.), and a drying and plasticizing step (drying and plasticizing temperature (temperature of the heating type screw of the single-screw extruder used at the time of the drying and plasticizing): 160° C.); one or more of A(X), A(Y), B(X) and B(Y) were varied to change the ratio of AB(Y)/AB(X); and the species and the blend amount of the carbon black were changed. Physical properties of the vulcanized rubber are shown in Table 1.

TABLE 1

| (Formulation) | | Comparative Example 1 | Comparative Example 2 | Comparative Example 3 | Comparative Example 4 | Comparative Example 5 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|---|---|---|
| Wet rubber masterbatch blending components | Carbon black N330 | 50 | 50 | 50 | 50 | 50 | 50 | 50 | 50 | 50 | 50 | 50 | 50 | 50 | 50 | 50 |
| | N110 | — | — | — | — | — | — | — | — | — | — | — | — | — | — | — |
| | N774 | — | — | — | — | — | — | — | — | — | — | — | — | — | — | — |
| | Natural rubber (solid) | 100 | 100 | 100 | 100 | 100 | 100 | 100 | 100 | 100 | 100 | 100 | 100 | 100 | 100 | 100 |
| Blending components at rubber composition | Zinc white | 3 | 3 | 3 | 3 | 3 | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 | 2 | 2 | 2 | 2 | 2 |
| | Anti-aging agent | 2 | 2 | 2 | 2 | 2 | 2 | 2 | 2 | 2 | 2 | 2 | 2 | 2 | 2 | 2 |
| | Sulfur | 2 | 2 | 2 | 2 | 2 | 2 | 2 | 2 | 2 | 2 | 2 | 2 | 2 | 2 | 2 |
| | Vulcanization accelerator | 1 | 1 | 1 | 1 | 1 | 1 | 1 | 1 | 1 | 1 | 1 | 1 | 1 | 1 | 1 |
| Dehydrating step conditions: | | | | | | | | | | | | | | | | | |
| Dehydrating temperature (heating type screw temperature) | | 160 | — | — | — | — | — | — | — | — | — | — | — | — | — | — |
| Screw shape | | (1) | — | — | Centrifugal separator used | — | — | — | — | — | — | — | — | — | — | — |
| AB(Y)/AB(X) | | 1.0 | — | — | | — | — | — | — | — | — | — | — | — | — | — |
| A(X) (mm) | | 0.9 | — | — | | — | — | — | — | — | — | — | — | — | — | — |
| B(X) (mm) | | 8.0 | — | — | | — | — | — | — | — | — | — | — | — | — | — |
| A(Y) (mm) | | 0.9 | — | — | | — | — | — | — | — | — | — | — | — | — | — |
| B(Y) (mm) | | 8.0 | — | — | | — | — | — | — | — | — | — | — | — | — | — |
| Water content by percentage in carbon-black-containing coagulate | | 5.0 | — | — | 27 | — | — | — | — | — | — | — | — | — | — | — |
| Drying and plasticizing step conditions: | | | | | | | | | | | | | | | | | |
| Drying and plasticizing temperature (heating type screw temperature) | | 160 | 200 | 200 | 200 | 200 | — | — | — | — | — | — | — | — | — | — |
| Screw shape | | (1) | (1) | (1) | (1) | (2) | — | — | — | — | — | — | — | — | — | — |
| AB(Y)/AB(X) | | 1.0 | 1.0 | 1.0 | 1.0 | 1.1 | — | — | — | — | — | — | — | — | — | — |
| A(X) (mm) | | 0.9 | 0.9 | 0.9 | 0.9 | 0.7 | — | — | — | — | — | — | — | — | — | — |
| B(X) (mm) | | 8.0 | 8.0 | 8.0 | 8.0 | 8.0 | — | — | — | — | — | — | — | — | — | — |
| A(Y) (mm) | | 0.9 | — | — | — | — | — | — | — | — | — | — | — | — | — | — |
| B(Y) (mm) | | 8.0 | — | — | — | — | — | — | — | — | — | — | — | — | — | — |
| Heating step conditions: | | | | | | | | | | | | | | | | | |
| Heating temperature (heating type screw temperature) | | — | 200 | 200 | — | 200 | 200 | 200 | 200 | 200 | 200 | 200 | 200 | 200 | 200 | 160-200 |
| Screw shape | | — | (1) Not formed | (1) Not formed | — | (2) Not formed | (2) Not formed | (2) Not formed | (2) Not formed | (2) Not formed | (1) Not formed | (1) Not formed | (3) Formed | (4) Formed | (4) Formed | (4) Formed |
| Step(s) of screw | | — | | | — | | | | | | | | | | | |
| AB(Y)/AB(X) | | — | 1.0 | 1.0 | — | 1.1 | 0.7 | 0.5 | 0.3 | 0.1 | 0.7 | 0.6 | 0.7 | 0.7 | 0.6 | 0.7 |
| A(X) (mm) | | — | 0.9 | 0.9 | — | 0.7 | 0.9 | 0.9 | 0.9 | 0.9 | 0.9 | 0.9 | 0.9 | 0.9 | 0.9 | 0.9 |
| B(X) (mm) | | — | 8.0 | 8.0 | — | 8.0 | 8.0 | 8.0 | 8.0 | 8.0 | 8.0 | 8.0 | 8.0 | 8.0 | 8.0 | 8.0 |

TABLE 1-continued

| (Formulation) | Comparative Example 1 | Comparative Example 2 | Comparative Example 3 | Comparative Example 4 | Comparative Example 5 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|---|---|
| A(Y) (mm) | — | 0.9 | 0.9 | — | 0.9 | 0.7 | 0.6 | 0.4 | 0.4 | 0.7 | 0.5 | 0.7 | 0.7 | 0.5 | 0.7 |
| B(Y) (mm) | — | 8.0 | 8.0 | — | 7.0 | 7.0 | 6.0 | 5.0 | 1.0 | 7.0 | 8.0 | 7.0 | 7.0 | 8.0 | 7.0 |
| Water content by percentage in carbon-black-containing coagulate | 0.95 | 1.22 | 1.10 | 1.03 | 1.10 | 0.68 | 0.64 | 0.57 | 0.50 | 0.66 | 0.63 | 0.55 | 0.53 | 0.54 | 0.50 |
| Viscosity (index) | 100 | 110 | 83 | 80 | 105 | 90 | 85 | 7.9 | 70 | 94 | 90 | 80 | 80 | 81 | 81 |
| Vulcanized rubber physical properties: | | | | | | | | | | | | | | | |
| M300(INDEX) | 100 | 98 | 88 | 85 | 96 | 114 | 115 | 113 | 108 | 119 | 118 | 110 | 115 | 117 | 124 |

Screw shape(1): shape designed in such a manner that from the upstream side toward the downstream side along the screw-shaft direction, the crest height of the screw is made gradually small, and further the shaft diameter of the screw is made gradually large.
Screw shape(2): shape designed in such a manner that from the upstream side toward the downstream side along the screw-shaft direction, the crest height of the screw is constant, and further the shaft diameter of the screw is made gradually large.
Screw shape(3): shape designed in such a manner that from the upstream side toward the downstream side along the screw-shaft direction, the crest height of the screw is constant, and further at least one step is formed.
Screw shape(4): shape designed in such a manner that from the upstream side toward the downstream side along the screw-shaft direction, the crest height of the screw is made gradually small, and further at least one step is formed.

TABLE 2

| (Formulation) | | | Comparative Example 6 | Example 11 | Comparative Example 7 | Example 12 |
|---|---|---|---|---|---|---|
| Wet rubber masterbatch blending components | Carbon black | N330 | — | — | — | — |
| | | N110 | 40 | 40 | — | — |
| | | N774 | — | — | 80 | 80 |
| | Natural rubber (solid) | | 100 | 100 | 100 | 100 |
| Blending components at rubber composition production time | Zinc white | | 3 | 3 | 3 | 3 |
| | Stearic acid | | 2 | 2 | 2 | 2 |
| | Anti-aging agent | | 2 | 2 | 2 | 2 |
| | Sulfur | | 2 | 2 | 2 | 2 |
| | Vulcanization accelerator | | 1 | 1 | 1 | 1 |
| Dehydrating step conditions: | | | | | | |
| Dehydrating temperature (heating type screw temperature) | | | 160 | — | 160 | — |
| Screw shape | | | (1) | — | (1) | — |
| AB(Y)/AB(X) | | | 1.0 | — | 1.0 | — |
| A(X) (mm) | | | 0.9 | — | 0.9 | — |
| B(X) (mm) | | | 8.0 | — | 8.0 | — |
| A(Y) (mm) | | | 0.9 | — | 0.9 | — |
| B(Y) (mm) | | | 8.0 | — | 8.0 | — |
| Water content by percentage in carbon-black-containing coagulate | | | 4.0 | — | 5.6 | — |
| Drying and plasticizing step conditions: | | | | | | |
| Drying and plasticizing temperature (heating type screw temperature) | | | 160 | — | 160 | — |
| Screw shape | | | (1) | — | (1) | — |
| AB(Y)/AB(X) | | | 1.0 | — | 1.0 | — |
| A(X) (mm) | | | 0.9 | — | 0.9 | — |
| B(X) (mm) | | | 8.0 | — | 8.0 | — |
| A(Y) (mm) | | | 0.9 | — | 0.9 | — |
| B(Y) (mm) | | | 8.0 | — | 8.0 | — |
| Heating step conditions: | | | | | | |
| Heating temperature (heating type screw temperature) | | | — | 200 | — | 200 |
| Screw shape | | | — | (1) | — | (1) |
| Step(s) of screw | | | — | Not formed | — | Not formed |
| AB(Y)/AB(X) | | | — | 0.7 | — | 0.7 |
| A(X) (mm) | | | — | 0.9 | — | 0.9 |
| B(X) (mm) | | | — | 8.0 | — | 8.0 |
| A(Y) (mm) | | | — | 0.7 | — | 0.7 |
| B(Y) (mm) | | | — | 7.0 | — | 8.0 |
| Water content by percentage in carbon-black-containing coagulate | | | 0.86 | 0.70 | 0.90 | 0.81 |
| Viscosity (index) | | | 100 | 89 | 100 | 87 |
| Vulcanized rubber physical properties: | | | | | | |
| M300 (INDEX) | | | 100 | 113 | 100 | 110 |

Screw shape(1): shape designed in such a manner that from the upstream side toward the downstream side along the screw-shaft direction, the crest height of the screw is made gradually small, and further the shaft diameter of the screw is made gradually large.

From Tables 1 and 2, in the wet rubber masterbatches according to Examples 1 to 12, only through a single step of the heating step, the water content by percentage is sufficiently made lower than in the wet rubber masterbatches according to Comparative Examples 1, 6 and 7. It is also understood that the Mooney viscosity is also made lower to attain the plasticization sufficiently. Furthermore, it is understood that also when the masterbatches of Examples 1 to 12 are each converted to the vulcanized rubber, the rubber is improved in strength.

The invention claimed is:

1. A method for producing a wet rubber masterbatch obtained using at least a filler, a dispersing solvent and a rubber latex solution as raw materials, wherein the method comprises:
    a coagulation step of mixing a slurry solution containing the filler and the dispersing solvent, and the rubber latex solution with each other to be coagulated, thereby producing a filler-containing rubber coagulate, and
    a heating step of using a single-screw extruder to heat the filler-containing rubber coagulate to 160° C. to 200° C., thereby dehydrating, drying and plasticizing the filler-containing rubber coagulate in a single step,
    wherein the single-screw extruder includes a screw, and an external cylinder in which a slit extended along the length direction of the external cylinder, in the screw-shaft direction, is formed in an internal wall surface of the external cylinder, and
    when the width of the slit is represented by A and the clearance between a crest of the screw and the internal wall surface of the external cylinder is represented by B, the following expression (1) is satisfied:

$$0 < AB(Y)/AB(X) < 0.9 \quad (1)$$

wherein AB (Y) is the product of A and B at a downstream side along the screw-shaft direction of the external cylinder, and AB (X) is the product of A and B at an upstream side along the screw-shaft direction of the external cylinder.

2. The wet rubber masterbatch producing method according to claim 1, wherein the screw is a screw having a shaft diameter that increases from the upstream side toward the downstream side along the screw-shaft direction.

3. The wet rubber masterbatch producing method according to claim 1, wherein the screw is a screw having at least one step permitting the shaft diameter of the screw to become larger toward a downstream side of the screw.

4. A wet rubber masterbatch produced by the producing method claim 1.

5. A rubber composition comprising the wet rubber masterbatch according to claim 4.

* * * * *